United States Patent [19]

Nielsen et al.

[11] Patent Number: 5,312,862

[45] Date of Patent: May 17, 1994

[54] METHODS FOR ADMIXING COMPRESSED FLUIDS WITH SOLVENT-BORNE COMPOSITIONS COMPRISING SOLID POLYMERS

[75] Inventors: Kenneth A. Nielsen, Charleston; Jeffrey J. Lear; John N. Argyropoulos, Scott Depot; Alex Chia-Huei Kuo, Charleston, all of W. Va.

[73] Assignee: Union Carbide Chemicals & Plastics Technology Corporation, Danbury, Conn.

[21] Appl. No.: 992,619

[22] Filed: Dec. 18, 1992

[51] Int. Cl.$^5$ ............................................. C08L 25/00
[52] U.S. Cl. ................................. 524/552; 524/560; 524/563; 524/588; 524/594; 524/597; 524/601; 524/604; 524/612; 536/58; 106/195
[58] Field of Search ............ 524/552, 560, 563, 588, 524/590, 594, 597, 601, , 604, 612; 536/58; 106/195

[56] References Cited

U.S. PATENT DOCUMENTS

| | | | |
|---|---|---|---|
| 4,582,731 | 4/1986 | Smith | 427/421 |
| 4,734,227 | 3/1988 | Smith | 264/13 |
| 4,734,451 | 3/1988 | Smith | 524/493 |
| 4,923,720 | 5/1990 | Lee et al. | 427/422 |
| 5,009,367 | 4/1991 | Nielsen | 239/3 |
| 5,057,342 | 10/1991 | Hoy et al. | 427/422 |

*Primary Examiner*—Maurice Welsh
*Attorney, Agent, or Firm*—J. F. Leightner

[57] ABSTRACT

Methods are presented by which compressed fluids such as carbon dioxide, nitrous oxide, and ethane can be admixed with solvent-borne compositions that contain a high concentration of solid polymer, such as coating compositions, whereby precipitation of the solid polymer can be avoided, thereby preventing plugging of the mixing apparatus.

24 Claims, 8 Drawing Sheets

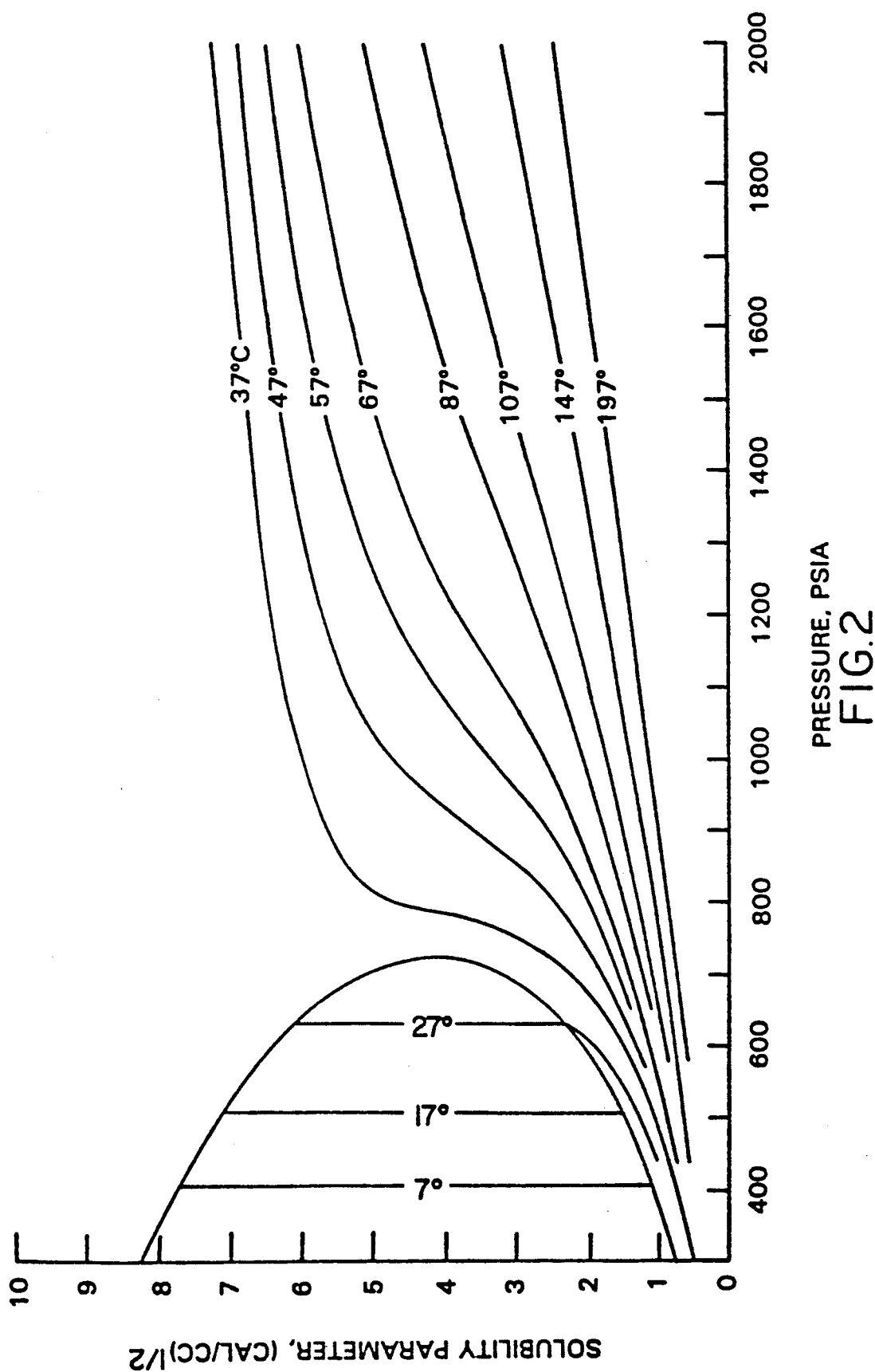

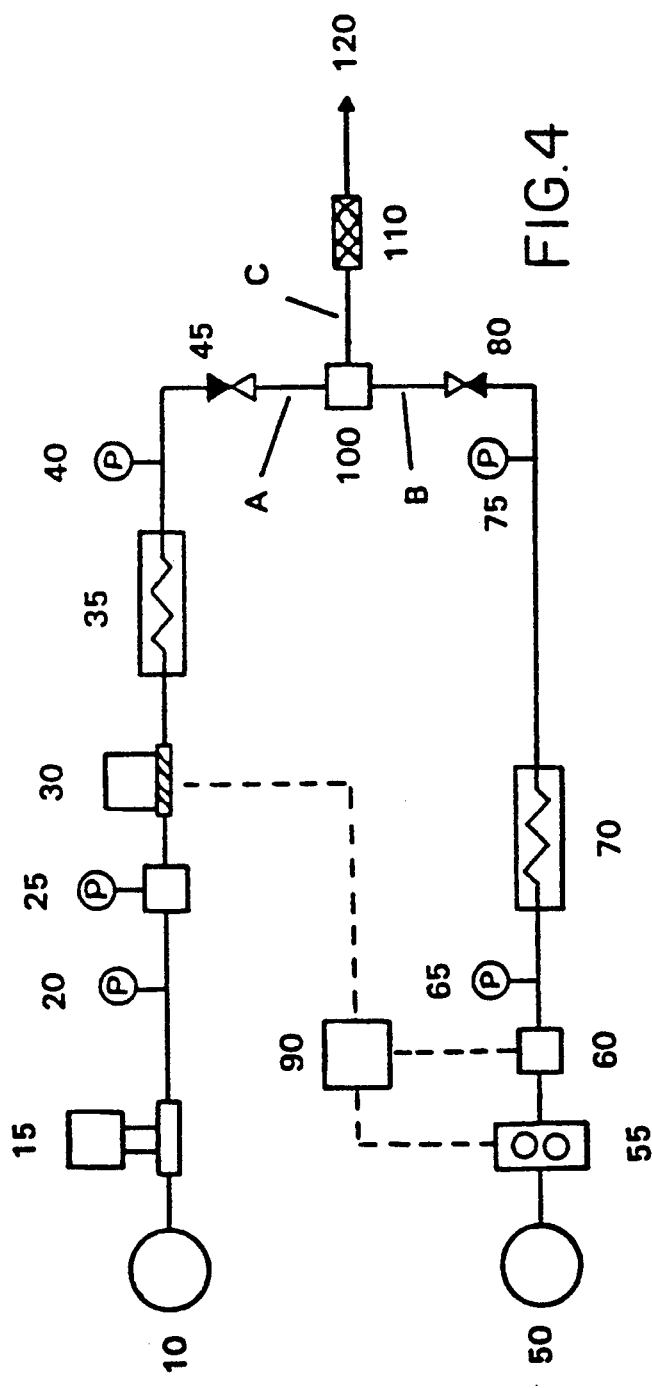
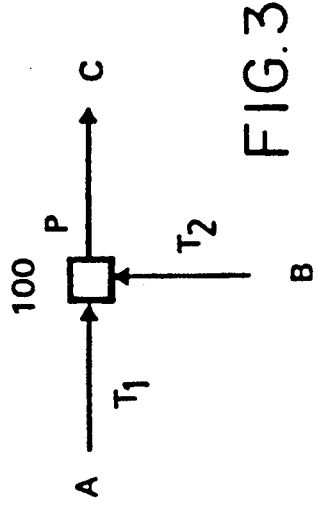
FIG.4
FIG.3

METHODS FOR ADMIXING COMPRESSED FLUIDS WITH SOLVENT-BORNE COMPOSITIONS COMPRISING SOLID POLYMERS

FIELD OF THE INVENTION

This invention, in general, pertains to the field of effectively mixing a proportioned plurality of fluids, particularly solvent-borne compositions and compressed fluids that are used as viscosity reducing diluents. More particularly, the present invention is directed to improved methods for forming transportable admixtures while substantially avoiding undesirable precipitation of solids and consequential plugging of the apparatus. The resultant liquid admixtures can then be transported and sprayed, such as to apply coatings to substrates.

BACKGROUND OF THE INVENTION

New spray technology has been developed for spraying solvent-borne compositions with markedly reduced solvent emissions by using environmentally acceptable supercritical compressed fluids such as carbon dioxide as a substitute for the solvents that are normally needed to obtain low spray viscosity. For coating compositions, solvent reductions up to 80 percent have been demonstrated, because only enough solvent for film coalescence and leveling is used.

Although the supercritical fluid spray methods have been highly successful, one difficult problem that is created is that the reformulated composition, which is called a concentrate, has much higher solids level and consequently much higher viscosity after the dilution solvent is eliminated, typically being 800 to 5000 centipoise or higher. Only when the concentrate is mixed with supercritical fluid is a low viscosity obtained. This makes material handling much more difficult than with conventional compositions that contain diluent solvents and therefore have a low solids level and low viscosity, typically below 100 centipoise. Nevertheless, a variety of concentrates have been manufactured at high solids levels and then successfully sprayed with compressed carbon dioxide.

Unexpectantly, however, another difficult problem has been discovered for some solvent-borne concentrates that contain a high concentration of solid polymer, such as some air-dry lacquer coating concentrates that contain high molecular weight polymers, so that they form a hard coating film after the solvents evaporate. Compressed fluids such as carbon dioxide and ethane have sometimes been found to frequently and repeatedly cause severe precipitation of the solid polymer when admixed with the concentrate to prepare a spray solution for spraying. The solid precipitate plugs the mixing apparatus and shuts down the spray operation. Coating concentrates containing cellulosic polymer such as nitrocellulose or cellulose acetate butyrate have been found to be particularly problematic. This has hindered implementation of commercial spray operations using these types of materials.

When this plugging problem was discovered, it was believed that the polymer precipitation was caused by the fluid mechanics of the admixing process, that is, by how the viscous concentrate and inviscid compressed fluid were physically contacted and the two fluids were mixed together. Therefore, it was believed that the precipitation could be reduced, at least to a tolerable level, by suitably controlling the fluid dynamics of the mixing process.

U.S. Pat. No. 5,105,843 discloses an isocentric low turbulence injector apparatus by which carbon dioxide can be injected as a core of fluid completely surrounded by the flow of concentrate such that turbulence at the interface between the two fluids is minimized and desirably maintained as laminar flow as the carbon dioxide dissolves into the concentrate.

Indeed, these mixing apparatus have been found to reduce precipitation and prolong plug-free operation under carefully controlled conditions. However, their performance has generally been disappointing. They have been found to be sensitive to changes or upsets in flow rates and other operating conditions. Often plugging has simply been delayed instead of prevented, so that plugging remains a serious problem for longer term operation. Furthermore, fluid mechanical principles have been unable to successfully predict operating conditions for which plugging does not occur nor have they been able to explain why plugging has occurred at some times and not others. Therefore, operation has had to be by trial and error.

There is therefore clearly a need for an improved method of admixing solvent-borne concentrates with compressed fluids that is reliable, that does not depend upon the particular design of the mixing apparatus, that is not sensitive to flow rate changes, that can substantially reduce or eliminate precipitation instead of just moderating the amount, and that can predict operating conditions under which precipitation and plugging do not occur.

SUMMARY OF THE INVENTION

By virtue of the present invention, methods have been discovered that are indeed able to accomplish the above noted objectives. Compressed fluids such as carbon dioxide and ethane can be admixed with solvent-borne compositions that contain a high concentration of solid polymer with little or no precipitation occurring, so that the mixing apparatus can reliably remain plug-free during extended operation. The methods do not require a particular mixing apparatus design or fluid mechanics and they can improve the operation of the aforementioned mixing apparatus. They are not sensitive to flow rate changes or upsets and they can predict favorable operating conditions for preventing precipitation.

Polymer precipitation has now been discovered to be controlled principally by the thermodynamic conditions under which the composition and compressed fluid are admixed and much less by the fluid mechanics of the mixing process. Indeed, the aforementioned special mixing apparatus are not required.

In its broadest embodiment, the present invention is directed to an improved method for pressurizing, proportioning, admixing, and forming an admixture of (i) a solvent-borne composition containing a high concentration of at least one solid polymer capable of being sprayed as a liquid solution and (ii) at least one compressed fluid as a viscosity reducing diluent, in at least an amount which when added to (i) is sufficient to render the viscosity of said admixture to a point suitable for being transportable, said compressed fluid being a gas at standard conditions of 0° Celsius temperature and one atmosphere pressure (STP), the improvement which comprises:

admixing the solvent-borne composition and the at least one compressed fluid together at pressure P, with the at least one compressed fluid having feed temperature $T_1$, such that the at least one compressed fluid, at pressure P and temperature $T_1$, is substantially a gas or a supercritical fluid and has a solubility parameter of about 0.5 to about 4 $(cal/cc)^{\frac{1}{2}}$, thereby substantially avoiding undesirable, precipitation of said solid polymer and consequential plugging of the apparatus.

In a preferred embodiment, the solvent-borne composition has feed temperature $T_2$ and the at least one compressed fluid, at pressure P and temperature $T_2$, is also substantially a gas or a supercritical fluid and has a solubility parameter of about 0.5 to about 4 $(cal/cc)^{\frac{1}{2}}$. In a more preferred embodiment, the admixing pressure P is below the critical bubble pressures for the admixture at temperatures $T_1$ and $T_2$. In a still more preferred embodiment, the admixing pressure P is below the minimum pressures at which an admixture of the solvent-borne composition and a high proportion of the at least one compressed fluid at equilibrium forms a mixture comprising a liquid phase and a solid phase when at temperatures $T_1$ and $T_2$. In another preferred embodiment, the compressed fluid is carbon dioxide, nitrous oxide, ethane, ethylene, propane, or a combination thereof.

In another embodiment, the solvent-borne composition comprises a solvent-born coating composition.

In another embodiment, the solid polymer has a solubility parameter greater than about 10 $(cal/cc)^{\frac{1}{2}}$. In another embodiment, the solid polymer comprises a cellulosic polymer, such as nitrocellulose polymer.

In still another embodiment, the admixture of solvent-borne composition and compressed fluid is sprayed by passing the admixture under pressure through an orifice to form a spray.

As used herein, the term "transportable" is meant to provide the admixture of solvent-borne composition and compressed fluid with a sufficiently low viscosity such that it is capable of being facilely conveyed by flowing from one point to another by any means, such as by pumping, by passing through a pipe or conduit, by passing through a filter, by passing through an orifice, being able to be sprayed, and the like. It is not meant to be merely taking the material and placing it into a container such that the conveyance of the container makes the material transportable.

In another embodiment, the present invention is directed to an improved method for pressurizing, proportioning, admixing, and forming an admixture of (i) a solvent-borne composition containing a high concentration of at least one solid polymer capable of being sprayed as a liquid solution and (ii) at least one compressed fluid as a viscosity reducing diluent, in at least an amount which when added to (i) is sufficient to render the viscosity of said admixture to a point suitable for being transportable, said compressed fluid being a gas at standard conditions of 0° Celsius temperature and one atmosphere pressure (STP), the improvement which comprises:

(1) forming a precursor admixture by admixing the solvent-borne composition with a recycled admixture of solvent-borne composition and at least one compressed fluid; and (2) admixing the precursor admixture and the at least one compressed fluid together at pressure P, with the at least one compressed fluid having feed temperature $T_1$, such that the at least one compressed fluid, at pressure P and temperature $T_1$, is substantially a gas or a supercritical fluid and has a solubility parameter of about 0.5 to about 4 $(cal/cc)^{\frac{1}{2}}$, thereby substantially avoiding undesirable precipitation of said solid polymer and consequential plugging of the apparatus.

Here again, in a preferred embodiment, the precursor admixture has feed temperature $T_2$ and the at least one compressed fluid, at pressure P and temperature $T_2$, is also substantially a gas or a supercritical fluid and has a solubility parameter of about 0.5 to about 4 $(cal/cc)^{\frac{1}{2}}$. In a more preferred embodiment, the admixing pressure P is below the critical bubble pressures for the admixture at temperatures $T_1$ and $T_2$. In a still more preferred embodiment, the admixing pressure P is below the minimum pressures at which an admixture of the solvent-borne composition and a high proportion of the at least one compressed fluid at equilibrium forms a mixture comprising a liquid phase and a solid phase when at temperatures $T_1$ and $T_2$.

BRIEF DESCRIPTION OF THE DRAWINGS

FIG. 2 is a diagram that gives the solubility parameter of compressed ethane as a function of temperature and pressure.

FIG. 3 is a flow diagram that illustrates in general how a flow of compressed fluid and a flow containing solvent-borne composition are admixed to form an admixture.

FIG. 4 is a schematic diagram of a continuous method and apparatus for directly admixing compressed fluid with a solvent-borne composition.

DETAILED DESCRIPTION OF THE INVENTION

Figure 1:
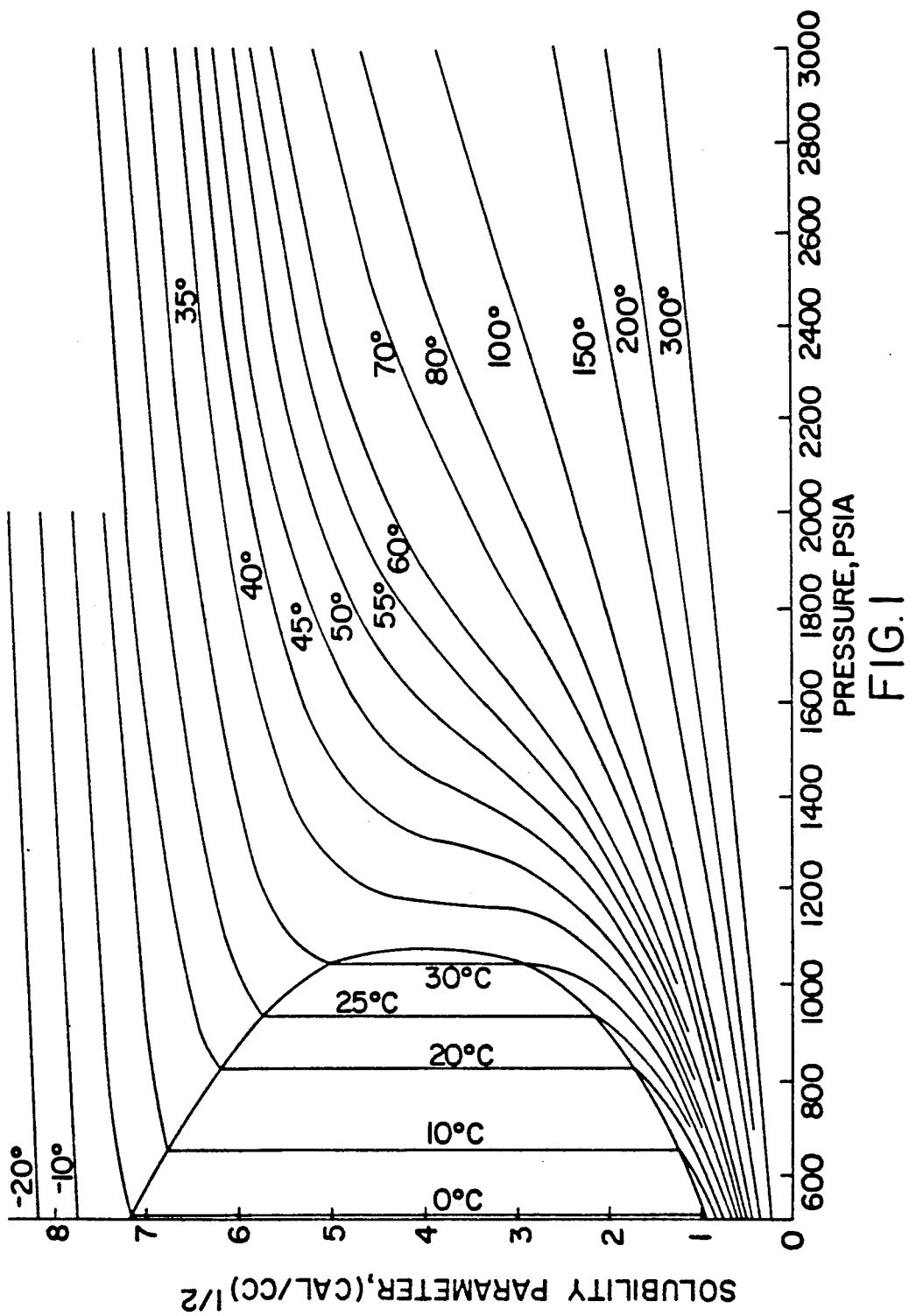
FIG. 1 is a diagram that gives the solubility parameter of compressed carbon dioxide as a function of temperature and pressure.

We have found that, by using the methods of the present invention, solvent-borne compositions containing a high concentration of solid polymer can be admixed with compressed fluids such as carbon dioxide or ethane with-little or no precipitation of the solid polymer to plug the mixing apparatus. This is accomplished by admixing the fluids under thermodynamic conditions of temperature and pressure that have been discovered in which very little solvent is lost from the solvent-borne polymer by extraction across the fluid interface into the compressed fluid phase during the mixing and dissolution process. Therefore, the solids level of the solvent-borne composition at the fluid interface does not increase to a level high enough to cause polymer precipitation. Furthermore, conditions have been discovered at which precipitation does not occur at equilibrium even for very high ratios of compressed fluid to solvent-borne composition that greatly exceed the solubility limit of compressed fluid.

As used herein, it will be understood that a "compressed fluid" is a fluid which may be in its gaseous state, its liquid state, or a combination thereof, or is a supercritical fluid, depending upon (i) the particular temperature and pressure to which it is subjected, (ii) the vapor pressure of the fluid at that particular temperature, and (iii) the critical temperature and critical pressure of the fluid, but which is in its gaseous state at standard conditions of 0° Celsius temperature and one atmosphere absolute pressure (STP). As used herein, a "supercritical fluid" is a fluid that is at a temperature and pressure such that it is at or above its critical point.

Compounds that may be used as compressed fluids in the present invention include but are not limited to carbon dioxide, nitrous oxide, xenon, ethane, ethylene, propane, propylene, chlorotrifluoromethane, monofluoromethane, and mixtures thereof.

Preferably, the compressed fluid has appreciable solubility in the solvent-borne composition and is environmentally compatible, can be made environmentally compatible by treatment, such as by thermal decomposition or incineration, or can be readily recovered from the spray environment, such as by absorption or adsorption. The utility of any of the above-mentioned compressed fluids in the practice of the present invention will depend upon the solvent-borne composition and solvents used, the temperature and pressure of application, and the inertness and stability of the compressed fluid.

Due to environmental compatibility, low toxicity, and high solubility, carbon dioxide, ethane, and nitrous oxide are preferred compressed fluids in the present invention. Due to low cost, non-flammability, stability, and wide availability, carbon dioxide is the most preferred compressed fluid.

As used herein, the phrase "solvent-borne composition" is understood to mean conventional liquid solvent-borne compositions, materials, concentrates, and formulations that have no compressed fluid admixed therewith. As also used herein, the phrases "coating composition", "coating formulation", and "coating concentrate" are understood to mean liquid compositions comprising conventional coating compositions, formulations, and concentrates that have no compressed fluid admixed therewith.

As used herein, the term "solvent" is understood to mean conventional solvents that have no compressed fluid admixed therewith and which are in the liquid state at conditions of about 25° Celsius temperature and one atmosphere absolute pressure.

As used herein, the phrase "solid polymer" is understood to also include polymers with high molecular weight that have very high viscosities, i.e., sufficient to plug the apparatus, in addition to solid polymers.

As used herein, the term "precipitate" is understood to include very viscous precipitates, in addition to solid precipitates which are capable of plugging the apparatus.

As used herein, the phrase "high concentration" of at least one solid polymer in the solvent-borne composition is understood to mean that the solvent-borne composition contains a sufficiently high concentration of solid polymer to cause precipitation when admixed with a high proportion of compressed fluid at high pressure. It does not necessarily mean that the absolute concentration of solid polymer has to be high. In some cases relatively low concentrations of solid polymer, such as 15 to 20 percent by weight, are sufficiently high to cause precipitation when admixed with the compressed fluid.

The solvent-borne compositions that may be used with the present invention are generally comprised of 1) a nonvolatile materials fraction containing a high concentration of at least one solid polymer capable of being sprayed as a liquid solution and 2) a solvent fraction in which the nonvolatile materials fraction is at least partially soluble or dispersible. Examples of solvent-borne compositions that may be used include coatings, adhesives, release agents, additive formulations, gel coats, polymeric materials for spray fabrication of structural or composite materials, including films, and the like.

The nonvolatile materials fraction, in addition to the at least one solid polymer, may contain materials such as other polymers, resins, and waxes; nonvolatile organic compounds such as organic pigments, herbicides, insecticides, antioxidants, surfactants, ultraviolet absorbers, whiteners, and plasticizers; and nonvolatile inorganic materials such as inorganic pigments, pigment extenders, fillers, decorative metallic flakes, abrasives, solid inorganic compounds, chemical agents, and glass fibers. As used herein, the phrase "nonvolatile materials fraction" is understood to include solid materials and liquid materials such as liquid polymers and other high-molecular-weight compounds that are nonvolatile at a temperature of about 25° Celsius. In general, the nonvolatile materials fraction is the fraction of the solvent-borne composition that remains after the solvent fraction has evaporated from the solvent-borne composition.

In general, divided solids in the nonvolatile materials fraction that are dispersed in the solvent-borne composition should have particle sizes that are sufficiently small to maintain a dispersed state, that is, to prevent settling, and to pass readily through a spray orifice.

The solid polymers are generally high molecular weight thermoplastic polymers but they may also be thermosetting materials and crosslinkable systems. The solid polymers may be used in combination with lower molecular weight non-solid or liquid polymers.

For coating applications, the solvent-borne composition will often comprise an air-dry lacquer coating formulation and the one or more solid polymers will comprise lacquer polymers. However, thermosetting, crosslinkable, and catalyzed coating formulations that contain at least one solid polymer may also be used.

In particular, the polymers include vinyl, acrylic, styrenic, and interpolymers of the base vinyl, acrylic, and styrenic monomers; polyesters, oil-free alkyds, alkyds, and the like; polyurethanes, oil-modified polyurethanes and thermoplastic urethanes systems; epoxy systems; phenolic systems; cellulosic esters such as acetate butyrate, acetate propionate, and nitrocellulose; amino resins such as urea formaldehyde, melamine formaldehyde, and other aminoplast polymers and resins materials; natural gums and resins; silicone polymers such as polydimethylsiloxane and related polymers; rubber-based adhesives including nitrile rubbers which are copolymers of unsaturated nitriles with dienes, styrene-butadiene rubbers, thermoplastic rubbers, neoprene or polychloroprene rubbers, and the like.

In addition to the nonvolatile materials fraction, a solvent fraction is also employed in the solvent-borne compositions. The solvent may perform a variety of functions, such as to dissolve the solid polymer and other polymers and components, to reduce viscosity, to give proper flow characteristics, and the like. As used herein, the solvent fraction is comprised of essentially any organic solvent or non-aqueous diluent which is at least partially miscible with the nonvolatile materials fraction so as to form a solution or dispersion. In general, the at least one solid polymer is soluble in the solvent fraction. The selection of a particular solvent fraction for a given nonvolatile materials fraction in order to form a coating formulation is well known to those skilled in the art. In general, up to about 30 percent by weight of water, preferably up to about 20 percent by weight, may also be present in the solvent fraction provided that a coupling solvent is also present. All such solvent fractions are suitable in the present invention.

A coupling solvent is a solvent in which the nonvolatile materials such as polymers are at least partially soluble. Most importantly, however, such a coupling solvent is also at least partially miscible with water. Thus, the coupling solvent enables the miscibility of the nonvolatile materials fraction, the solvent fraction, and the water to the extent that a single liquid phase is desirably maintained such that the composition may optimally be sprayed and, for example, a good coating formed. Coupling solvents are well known to those skilled in the art and any conventional coupling solvents which are able to meet the aforementioned characteristics are suitable for being used in the present invention. Applicable coupling solvents include, but are not limited to, ethylene glycol ethers, propylene glycol ethers, and chemical and physical combinations thereof; lactams; cyclic ureas; and the like. When water is not present in the solvent-borne composition, a coupling solvent is not necessary, but may still be employed.

Other solvents which may be present in typical solvent-borne compositions, including coating compositions and the like, and which may be utilized in the present invention include ketones such as acetone, methyl ethyl ketone, methyl isobutyl ketone, methyl amyl ketone, cyclohexanone and other aliphatic ketones; esters such as methyl acetate, ethyl acetate, and other alkyl carboxylic esters; ethers, such as methyl t-butyl ether, dibutyl ether, methyl phenyl ether and other aliphatic or alkyl aromatic ethers; glycol ethers such as ethoxy ethanol, butoxy ethanol, ethoxy 2-propanol, propoxy ethanol, butoxy 2-propanol and other glycol ethers; glycol ether esters such as butoxy ethoxy acetate, ethyl 3-ethoxy propionate and other glycol ether esters; alcohols such as methanol, ethanol, propanol, butanol, amyl alcohol and other aliphatic alcohols; aromatic hydrocarbons such as toluene, xylene, and other aromatics or mixtures of aromatic solvents; aliphatic hydrocarbons such as VM&P (varnish makers and painters) naphtha and mineral spirits, and other aliphatics or mixtures of aliphatics; and nitroalkanes such as 2-nitropropane. Compressed fluids have been found to be good viscosity reducing diluents for solvent-borne compositions such as coating formulations. For example, consider an acrylic concentrate that has a viscosity of 1340 centipoise (25° Celsius). Adding carbon dioxide to 30 weight percent concentration reduces the viscosity to below 25 centipoise.

Preferably, the transportable viscosity of the admixture of solvent-borne composition and compressed fluid is less than about 200 centipoise, more preferably less than about 100 centipoise, and most preferably less than about 50 centipoise.

In general, for the compressed fluid to produce sufficient viscosity reduction to maintain a transportable composition, the compressed fluid, such as carbon dioxide, preferably has a solubility in the solvent-borne composition of at least about 10 weight percent, based upon the total weight of compressed fluid and solvent-borne composition, more preferably of at least about 15 weight percent, still more preferably of at least about 20 weight percent, and most preferably of at least about 25 weight percent.

The concept of a solubility parameter of a material or compound is well known to those skilled in the art of solution theory and is commonly used by those skilled in the art of formulating solvent-borne coating compositions. For example, see Barton, A. F. M., *CRC Handbook of Solubility Parameters and Other Cohesion Parameters*, CRC Press, Boca Raton, Fla., 1983. Solubility parameters are useful because regular solution theory predicts that materials that have similar or identical solubility parameters will be mutually soluble. The solubility parameter is defined as the square root of the cohesive energy density of a material and describes the attractive strength between the molecules of the material. The solubility parameter has units of (calories per cubic centimeter)$^{\frac{1}{2}}$. The cohesive energy is the energy change required to isothermally expand a given volume of a material from a given physical state at a given temperature and pressure to the ideal gas state at infinite volume. The cohesive energy density is the cohesive energy per unit volume of the material. As used herein, it will be understood that the term "solubility parameter" refers to this solubility parameter which is also commonly called the total solubility parameter or Hildebrand solubility parameter.

For saturated liquids at low pressure, the cohesive energy density is the molar energy of vaporization divided by the molar volume, because the energy of expansion of gases below one atmosphere pressure is generally negligible compared to the energy of vaporization. For normal liquids, the solubility parameter is generally insensitive to pressure but varies with temperature. Therefore, liquid solubility parameters are normally specified at a reference temperature of 25° Celsius. The solubility parameters of some common solvents are given below:

7.3 Hexane
7.6 V M & P Naphtha 8.1 Turpentine
8.7 Butyl Acetate
8.9 Toluene
9.0 Ethyl 3-Ethoxypropionate
9.0 Methyl Amyl Ketone
9.6 Acetone
9.9 Ethylene Glycol Monobutyl Ether
10.0 Cyclohexanone
11.1 Diethylene Glycol Monomethyl Ether
11.4 Isopropanol
11.6 n-Butanol
12.8 Ethanol
14.5 Methanol The average solubility parameter for a mixture of solvents can be calculated with sufficient accuracy by basing the average on the volume fraction of the solvents.

The solubility parameter of a polymer can not generally be measured directly, because few polymers can be vaporized without decomposing. Therefore, the polymer solubility parameter is generally determined to be the same as that of a solvent in which the polymer mixes in all proportions without changes in heat or volume and without reaction or other special associations. In this manner solubility parameters have been determined for many polymers. For example, see Brandrup, J. and Immergut, E. H., *Polymer Handbook*, Wiley-Interscience, 1975, 1989. Group contribution methods have also been developed for predicting polymer solubility parameters from molecular structure. In general, polymer solubility parameter values vary with composition and therefore often depend upon how the polymer is manufactured. Solubility parameters of some common polymers are given below:

15.6 Cellulose
13.3 Cellulose Acetate
11.9 Cellulose Acetate Butyrate
11.5 Nitrocellulose
10.9 Epoxy Resin
10.8 Polyvinylchloride VAGH
10.3 Ethyl Cellulose
10.0 Polyurethane
10.0 Poly(vinylchloride-co-vinylacetate)
9.8 Acryloid B-66 Acrylic Polymer
9.6 Polyvinylacetate
9.4 Alkyd, Medium Oil Length
9.2 Poly(methyl methacrylate)
9.1 Polystyrene
8.7 Poly(butyl methacrylate)
8.4 Poly(butadiene-co-styrene), 90/10
8.0 Polyethylene
8.0 Natural Rubber
7.3 Poly(oxydimethylsilylene)
6.2 Poly(tetrafluoroethylene)

In general, solid polymers with high solubility parameter can readily form precipitates when admixed with compressed fluid. Solid polymers with solubility parameters above about 10 $(cal/cc)^{\frac{1}{2}}$ can have significant tendency to form precipitates. In particular, cellulosic solid polymers such as nitrocellulose polymer and cellulose acetate butyrate have been determined to readily form precipitates and plug apparatus. Other types of polymers, such as a polyvinylchloride polymer and an acrylic polymer having a solubility parameter of about 10 $(cal/cc)^{\frac{1}{2}}$ or above have also been demonstrated to form precipitates.

Solubility parameters for compressed fluids can be measured directly or calculated from enthalpy and volumetric data or equations of state by procedures that are familiar to those skilled in the art. The solubility parameters of compressed gases are strongly dependent upon temperature and pressure, especially at supercritical conditions. The solubility parameters of carbon dioxide and ethane are given in FIGS. 1 and 2, respectively, as a function of temperature and pressure.

The solubility parameter values generally vary similarly to the density of the fluid. Therefore, the solubility parameter can often be estimated by using density data and a solubility parameter value for the liquid compressed gas, by assuming the solubility parameter ratio is approximately the same as the density ratio. This often gives an accuracy within 10 percent.

The present invention provides methods for admixing solvent-borne compositions containing a high concentration of solid polymer with compressed fluids so as to substantially avoid undesirable precipitation of the solid polymer and thereby prevent plugging of the apparatus caused by the precipitation. This is generally illustrated in FIG. 3. The flow of compressed fluid A with feed temperature $T_1$ and the flow containing solvent-borne composition B with feed temperature $T_2$ are admixed at pressure P in mixing manifold 100 to produce the flow of admixture C.

Mixing manifold 100 may be any suitable device for admixing or combining two fluid streams to produce a third fluid stream, such as a mixing tee, an isocentric injector, a membrane injector, and the like. For example, the mixing tee may be a 180° mixing tee comprising a pipe or tubing tee in which the solvent-borne composition and compressed fluid are fed opposing each other in the run of the tee, with the admixture exiting through the branch of the tee. The mixing tee may also be a 90° tee comprising a pipe or tubing tee in which one of the two fluids is fed to the run of the tee and the other is fed to the branch of the tee, with the admixture exiting through the run of the tee. Other forms of tubular mixers comprising two inlets and one outlet may also be used, such as a mixing "Y", two parallel feed tubes exiting into one larger tube, or concentric feed tubes as in the isocentric mixer. The mixer may also comprise a small vessel with two inlets and one outlet. However, the vessel should be constructed such that the fluids have short residence time and such that the fluids are well blended together despite having significantly different densities and viscosities, as will be apparent to those skilled in the art of mixing. Static mixing or mechanical mixing devices may also be employed in the mixer or after the mixer to better mix the flows if desired. Turbulence generation devices may also be employed. It will be apparent to those skilled in the art of mixing that other variations of the admixing may be used, such as having multiple feed inlets or having multiple outlets. The design of the mixing manifold is not critical to the practice of the present invention provided that effective admixing is accomplished.

The compressed fluid and solvent-borne composition are admixed in the mixing manifold at pressure P. It is understood that the pressure P is the pressure at which the compressed fluid and solvent-borne composition are actually physically contacted together to form the admixture. The admixing pressure P will generally correspond to the exit pressure of the admixture from the mixing manifold, provided that the manifold exit is not constricted so as to produce significant pressure drop. Preferably the mixing manifold is designed to allow the admixture to exit at substantially the admixing pressure P. If the flow inlets to the mixing manifold are designed to feed the fluids with significant pressure drop across the inlet, such as through a feed valve, through an inlet orifice to produce a jetting or turbulent flow, or compressed fluid fed by diffusion through a membrane, it is understood that the admixing pressure corresponds to the internal pressure within the mixing manifold after the fluid has passed through the inlet constriction or membrane.

The compressed fluid is admixed with feed temperature $T_1$ and the solvent-borne composition is admixed with feed temperature $T_2$. It is understood that the feed temperatures $T_1$ and $T_2$ correspond to the temperatures the fluids have, respectively, when they are first brought into actual physical contact to form the admixture. The compressed fluid can be highly compressible, so adiabatic pressure changes can significantly cool or heat the compressed fluid by virtue of the work of expansion or contraction. Therefore, if the inlet to the mixing manifold is constricted such that the compressed fluid undergoes a significant drop in pressure as it passes through the inlet, the compressed fluid will have lower temperature when it leaves the inlet than before it entered the inlet. The feed temperature $T_1$ of the compressed fluid is then the lower temperature obtained after having passed through the inlet. Temperature changes can also come about by heat losses or gains, such as when the fluids flow through uninsulated tubing from a heater to the mixing manifold.

As the compressed fluid and solvent-borne composition are admixed, heat transfer occurs as well as mixing, so their temperatures each approach the final temperature of the well mixed admixture. The admixture temperature, in addition to the admixture temperatures, depends upon the proportion of compressed fluid to solvent-borne composition, the heat capacities, and the heat of mixing. The admixing will generally occur under nearly adiabatic conditions. The admixture temperature will generally be between $T_1$ and $T_2$ if the heat of mixing is small.

The compressed fluid and solvent-borne composition can in general be admixed either directly or indirectly. In the direct method, the two fluids are mixed in one step to form the desired admixture. That is, flow A is entirely compressed fluid and flow B is entirely solvent-borne composition in FIG. 3. In the indirect method, the two fluids are mixed in two steps to form the desired admixture by using a recycled portion of the admixture. The first step comprises admixing the solvent-borne composition with a recycle flow of the admixture to form a precursor admixture that contains both solvent-borne composition and compressed fluid. The second step comprises admixing the compressed fluid with the precursor admixture to form the desired admixture. Therefore, in FIG. 3, flow A is entirely compressed fluid and flow B is the precursor admixture containing both solvent-borne mixture and compressed fluid. Other combinations of admixing the fluids may also be used, such as admixing the compressed fluid as two or more flows or admixing the solvent-borne compositions as two or more flows. All such methods may be utilized in the present invention.

An apparatus that may be utilized to directly admix compressed fluid with solvent-borne composition in a desired proportion is illustrated in FIG. 4. Compressed fluid from cylinder 10 is pressurized by pump 15, such as Haskel model 8DSFD-25, to a pressure between 1600 and 2000 psig, as shown by pressure gauge 20, and then regulated to the desired admix pressure by pressure regulator 25, as shown by pressure gauge 40. Mass flow meter 30, such as Micro Motion model D6, measures the mass of compressed fluid fed through check valve 45 to mixing manifold 100 for admixing with solvent-borne composition. The compressed fluid is heated to the desired feed temperature $T_1$ by heater 35. The solvent-borne composition is supplied from tank 50 and may be pressurized to 200 to 1200 psi by a supply pump (not shown). It is pressurized and metered by precision gear pump 55, such as Zenith model HLB-5592. The pressure in the line is measured by pressure gauge 65. Precision gear meter 60, such as AW Company model ZHM-02, measures the amount delivered through check valve 80 to the mixing manifold. The speed command of gear pump 55 is electronically controlled by an input signal (dashed line) from mass flow meter 30 by using control system 90, such as Zenith ZeDrive Speed Control System model 17, to automatically obtain the desired proportion of solvent-borne composition and compressed fluid. The metering rate is electronically adjusted by a feedback signal from gear meter 60 to correct for pumping inefficiency. The solvent-borne composition is heated to the desired feed temperature $T_2$ by heater 70. The feed pressure is indicated by pressure gauge 75. Check valves 45 and 80 ensure that the flows of compressed fluid A and solvent-borne composition B are admixed in mixing manifold 100, at the same pressure P to form the desired proportioned admixture C, which is further mixed in static mixer 110 to form a well mixed admixture 120 for delivery to the application (not shown).

Figure 5:
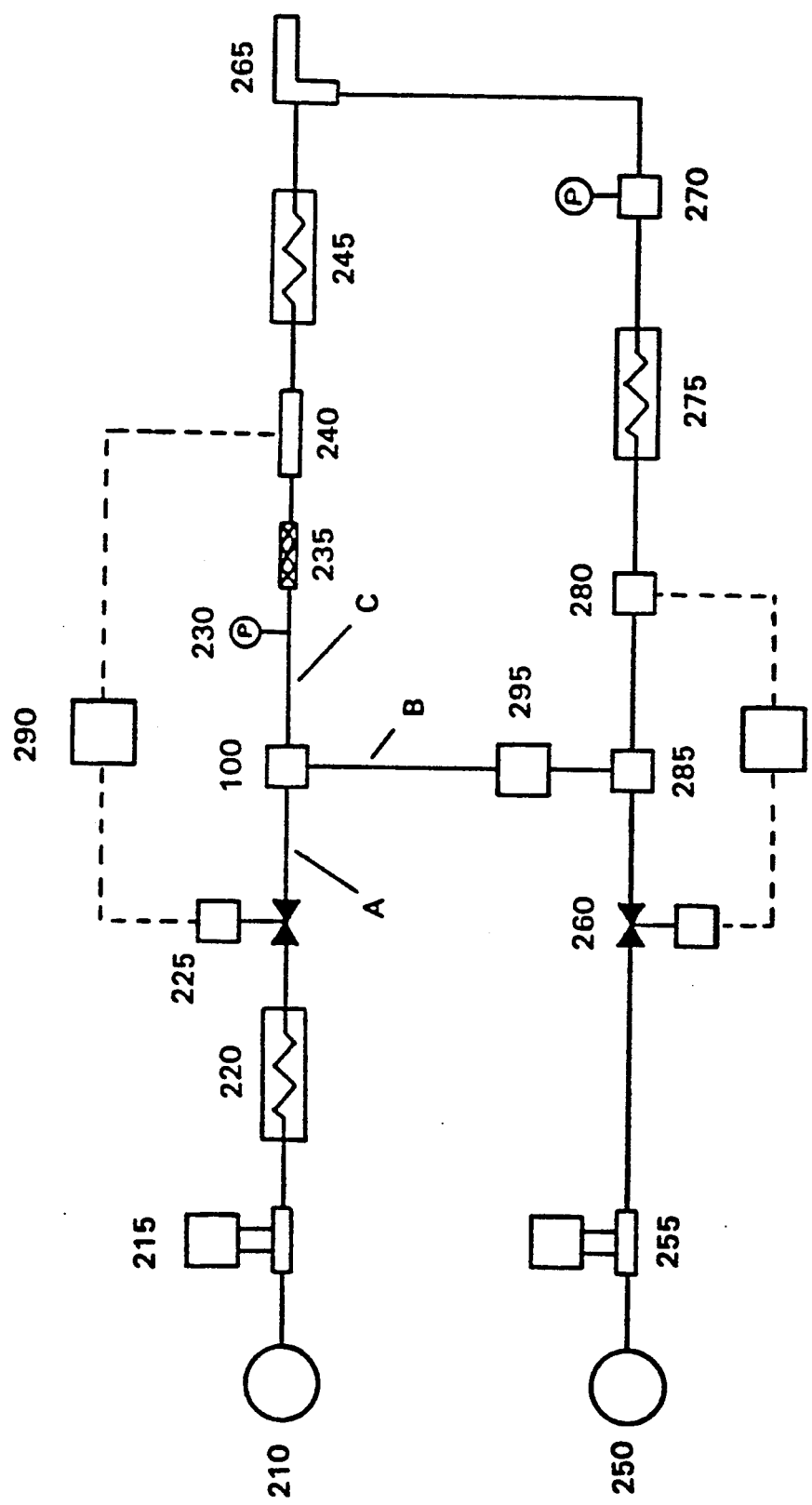
FIG. 5 is a schematic diagram of a continuous method and apparatus for indirectly admixing compressed fluid such as carbon dioxide with a solvent-borne composition such as coating concentrate.

An apparatus that may be utilized to indirectly mix compressed fluid with solvent-borne composition in a desired proportion is illustrated in FIG. 5. The apparatus is a modified UNICARB® System Supply Unit manufactured by Nordson Corporation to proportion, mix, heat, and pressurize solvent-borne coating concentrates with compressed carbon dioxide for the spray application of coatings. The apparatus has been modified by the addition of compressed fluid heater 220. Although the apparatus and mixing method will be described in terms of admixing coating concentrate and carbon dioxide, it is understood that other solvent-borne compositions and compressed fluids may also be used.

Carbon dioxide is supplied from supply tank or cylinder 210, pressurized by air-driven pump 215, and heated in heater 220. Control valve 225 feeds the heated carbon dioxide to mixing manifold 100. Control valve 225 automatically adds carbon dioxide at the rate required to maintain the carbon dioxide concentration in admixture C at the set point level. Control valve 225 is controlled by controller 290 in response to a signal (dashed line) from electrical capacitance cell 240, which measures the concentration of carbon dioxide in the admixture. The feed temperature $T_1$ of the carbon dioxide flow A to the mixing manifold is the temperature that results from cooling that can occur as the carbon dioxide is depressurized as it flows through control valve 225. Heater 220 is set to a temperature that compensates for any expansion cooling.

Coating concentrate is supplied from tank 250, pressurized by pump 255, and fed by control valve 260 to mixing manifold 285, where it is admixed with a recycled mixture of coating concentrate and carbon dioxide to form precursor admixture flow B, which is pressurized by air-driven circulation pump 295. Control valve 260 automatically adds coating concentrate to the recycle flow at the rate required to maintain constant pressure in the recycle. Control valve 260 is controlled by controller 290 in response to a signal (dashed line) from flow pressure transducer 280. For drawing convenience, controller 290 is shown twice in FIG. 5.

The carbon dioxide flow A and precursor admixture flow B are admixed at pressure P, as measured by pressure gauge 230, to form the desired admixture flow C, which is at the desired spray pressure, if flow pressure losses are neglected. The admixture is further mixed by static mixer 235 and heated by heater 245 to the desired spray temperature for spray application by spray gun 265. The spray pressure is maintained constant by pressure regulator 270. Optional heater 275 is used to trim heat the temperature of the recycled admixture to the proper temperature to establish the desired precursor admixture feed temperature $T_2$ of flow B to mixing manifold 100.

We have discovered that precipitation that causes plugging of the apparatus can be substantially avoided when compressed fluid is admixed with solvent-borne composition containing a high concentration of solid polymer if the compressed fluid is admixed under temperature and pressure conditions wherein the compressed fluid is substantially a gas or a supercritical fluid and has a solubility parameter less than about 4.0 $(cal/cc)^{\frac{1}{2}}$ during the admixing or blending process. Without wishing to be bound by theory, we believe that when the compressed fluid is a gas or a supercritical fluid and has a solubility parameter below about 4.0 $(cal/cc)^{\frac{1}{2}}$, the compressed fluid ceases to be an effective extractant for the solvent contained in the solvent-borne composition, so solvent loss from the solvent-borne composition into the compressed fluid phase during admixing, which causes precipitation, is substantially avoided. The temperature and pressure combinations that give a solubility parameter below about 4.0 $(cal/cc)^{\frac{1}{2}}$ can be determined from FIG. 1 for carbon dioxide and from FIG. 2 for ethane. For example, carbon dioxide has a solubility parameter of 4.0 $(cal/cc)^{\frac{1}{2}}$ at a temperature of 50° Celsius and a pressure of 1600 psi. The corresponding density is 0.51 g/cc. Ethane has a solubility parameter of 4.0 $(cal/cc)^{\frac{1}{2}}$ at temperature of 50° Celsius and a pressure of 980 psi. The corresponding density is 0.205, which is much lower than the carbon dioxide density. The solubility parameters for nitrous oxide are expected to be similar to those for carbon dioxide, because they have very nearly the same critical conditions and density, and they have the same molecular weight, so FIG. 1 can be used to approximate the solubility parameter dependence for nitrous oxide. The solubility parameter dependence for other compressed fluids can be measured, calculated, or estimated as aforementioned.

During the admixing process, as aforementioned, the pressure of the compressed fluid remains substantially constant at the admixing pressure P. The temperature of the compressed fluid, however, changes from the feed temperature of the compressed fluid to the final temperature of the admixture. Some of the compressed fluid can also be temporally heated or cooled to nearly the feed temperature of the solvent-borne composition. Furthermore, as the proportion of solvent-borne composition to compressed fluid increases, the final admixture temperature becomes closer to the feed temperature of the solvent-borne composition. Therefore, at the admixing pressure P, the compressed fluid should have a solubility parameter of less than about 4.0 $(cal/cc)^{\frac{1}{2}}$, preferably less than about 3.5 $(cal/cc)^{\frac{1}{2}}$, and more preferably less than about 3.0 $(cal/cc)^{\frac{1}{2}}$, at the feed temperature $T_1$ of the compressed fluid and preferably at the feed temperature $T_2$ of the solvent-borne composition. At lower solubility parameter values, the compressed fluid is much less capable of extracting solvent from the solvent-borne composition during admixing.

In the limit of very low solubility parameter values below about 0.5 $(cal/cc)^{\frac{1}{2}}$, the compressed fluid has very low density due to low pressure, high temperature, or both. These conditions are not conducive to obtaining high solubility of the compressed fluid in the solvent-borne composition. Therefore, at the admixing pressure P, the compressed fluid should have a solubility parameter greater than about 0.5 $(cal/cc)^{\frac{1}{2}}$, preferably greater than about 0.75 $(cal/cc)^{\frac{1}{2}}$, and more preferably greater than about 1.0 $(cal/cc)^{\frac{1}{2}}$, at the feed temperature $T_1$ of the compressed fluid and at the feed temperature $T_2$ of the solvent-borne composition.

Liquids and supercritical fluids with high solubility parameters have been discovered to be effective extractants of solvent from the solvent-borne composition, and therefore they are to be avoided during admixing. Therefore, to minimize the possibility that some compressed gas might be liquefied due to upsets in operating conditions, or the inability to precisely know the admixing conditions, preferably the feed temperature $T_1$ of the compressed fluid and the feed temperature $T_2$ of the solvent-borne composition are above the critical temperature of the compressed fluid, more preferably greater than about 5 Celsius degrees above the critical temperature.

Generally, the nonvolatile materials fraction of the solvent-borne compositions of the present invention, such as the polymers, and the compressed fluid must be able to withstand the temperatures and pressures to which they are subjected as they are admixed with the compressed fluid and afterward, such as for spraying.

High temperature can increase volatility losses of solvent from the solvent-borne composition into the compressed fluid during admixing. Therefore, preferably the feed temperature $T_1$ of the compressed fluid and the feed temperature $T_2$ of the solvent-borne composition are below about 150° Celsius, more preferably below about 100° Celsius.

Although high admixing pressures P of 5000 psi and higher may be used, preferably the admixing pressure P is below about 3000 psi, more preferably below about 2000 psi. Very low pressure is generally not compatible with high compressed fluid solubility in the solvent-borne composition. Therefore, preferably the admixing pressure P is above about 50 percent of the critical pressure of the compressed fluid.

When continuous methods for the spray application of coatings using supercritical fluids such as carbon dioxide were first being developed, the coating concentrate and carbon dioxide were pumped and proportioned using a Graco Variable Ratio Hydra-Cat™ Proportioning Pump unit. It proportions the fluids together at a given volume ratio by using two double-acting piston pumps that are slaved together by a moving beam that drives the piston rods. A four check-valve pump was used for the carbon dioxide because it is supplied under pressure. It was soon discovered that the compressibility of liquid carbon dioxide at ambient temperature is high enough to cause significant flow oscillations and fluctuations in the delivered carbon dioxide, even when it was supplied at a pressure significantly above its vapor pressure to suppress cavitation. This caused unsatisfactory oscillation in the carbon dioxide concentration in the spray. Using a heater to heat the liquid carbon dioxide delivered under pressure by the pump in order to admix supercritical carbon dioxide with the coating concentrate was found to cause so much flow oscillation and irregularity, because of the greatly increased compressibility, that the spray system could not be operated. In order to eliminate compressibility effects, it was found necessary to refrigerate the liquid carbon dioxide to a temperature below 10° Celsius, preferably below 0° Celsius, to make the carbon dioxide incompressible. This also eliminated pump cavitation so that the carbon dioxide supply need not be pressurized above the vapor pressure.

This operating experience lead to the development of the aforementioned proportioning systems shown in FIGS. 4 and 5, which have been modified by the addition of compressed fluid heaters 35 and 220, respectively. The Nordson system in FIG. 5 avoids directly proportioning and metering the feed flow rates by instead controlling the measured concentration of carbon dioxide in the circulating admixture. Nevertheless, both proportioning systems teach pumping and admixing liquid carbon dioxide with the coating concentrate as the preferred mode of operation. The carbon dioxide is then made a supercritical fluid diluent by heating the admixture to the desired spray temperature. Pumping liquid carbon dioxide is greatly preferred to minimize cavitation and compressibility problems, which can greatly reduce pumping efficiency or cause pumping to cease entirely. In practice, the liquid carbon dioxide is also sometimes pressurized in two stages by using a booster pump located at the carbon dioxide supply (not shown in the Figures) to supply the carbon dioxide to the primary feed pump.

These proportioning and mixing systems performed well until nitrocellulose coating concentrates were used, which caused precipitation and plugging problems of the mixing tees.

During commercial operation of the Nordson units, as precipitation began to cause partial plugging in the carbon dioxide injector tube following startup, in order to prolong operation, the carbon dioxide feed pressure to control valve 225 would be increased to maintain carbon dioxide flow until the plugging shut down operation. Therefore, it became standard practice to set the carbon dioxide feed from pump 215 to a high pressure, such as 2000 to 2200 psi or higher, even though the admixing pressure in the circulation loop was much lower, such as 1200 to 1400 psi. We have discovered that such high feed pressures aided precipitation, because the large pressure drop across control valve 225 cooled the carbon dioxide by expansion, so it was admixed as a liquid at lower temperature and therefore with a higher solubility parameter.

When the carbon dioxide heater 220 was first installed in the feed line in order to warm the carbon dioxide before admixing, significant precipitation was often found to still occur. The large pressure drop across control valve 225, caused by the high feed pressure, significantly cooled the heated carbon dioxide by expansion, so it was a liquid or a supercritical fluid with high solubility parameter when it admixed with the precursor admixture.

Therefore, when the Nordson system shown in FIG. 5 is operated, preferably the compressed fluid is heated in heater 220 to a higher temperature than the desired feed temperature in order to compensate for expansion cooling across control valve 225. Preferably the pressure drop across control valve 225 is also low, preferably less than about 500 psi, more preferably less than about 300 psi, and most preferably about 200 psi, provided that this gives proper operation at the feed rates utilized.

The proportioning systems shown in FIGS. 4 and 5 have been demonstrated to give good operation with heated carbon dioxide despite the much higher compressibility in the flow downstream from the pumps.

We have furthermore discovered admixing conditions at which precipitation does not occur at equilibrium even for very high ratios of compressed fluid to solvent-borne composition that greatly exceed the solubility limit of the compressed fluid.

Figure 6:
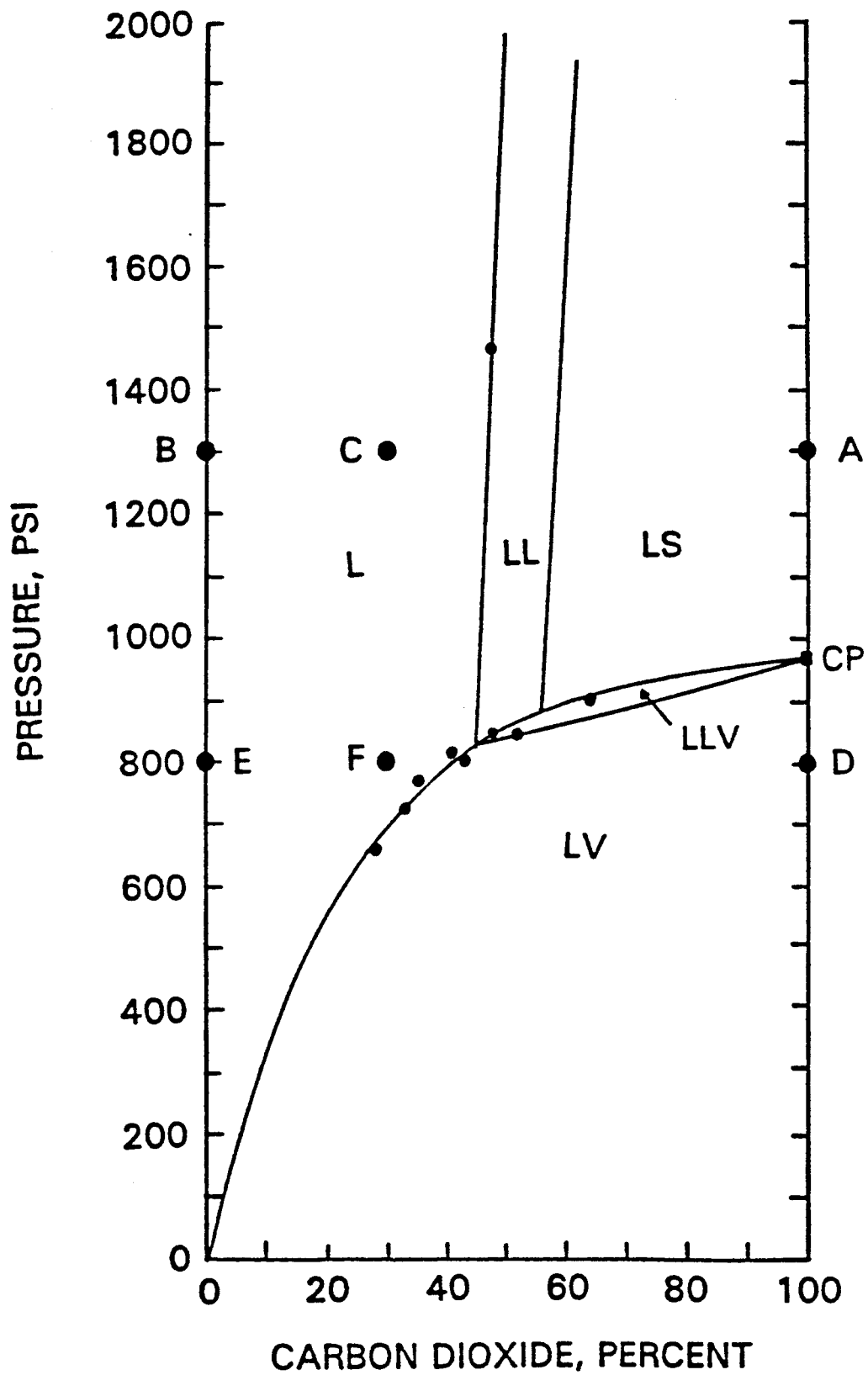
FIG. 6 is a phase diagram that illustrates the number and types of phases formed and the critical bubble pressure for admixtures of a commercial nitrocellulose coating concentrate and compressed carbon dioxide as a function of pressure and carbon dioxide concentration at a temperature of 27° Celsius.

A measured equilibrium phase diagram is shown in FIG. 6 for a solvent-borne composition that is a commercial nitrocellulose coating concentrate and for carbon dioxide being the compressed fluid. The coating concentrate contains about 38 weight percent nitrocellulose and alkyd solid polymers dissolved in a solvent blend. The phase diagram shows the number and types of phases formed for admixtures ranging from 0 to 100 percent carbon dioxide by weight as a function of pressure, all at a constant temperature of 27° Celsius. The solid lines border regions having the same number and types of phases, although the compositions and amounts of the phases can change with location within the regions. The regions are: a liquid region (L); a liquid-vapor region (LV); a liquid-liquid region (LL); a liquid-solid region (LS); and a liquid-liquid-vapor region (LLV).

In the liquid region (L), the carbon dioxide is completely dissolved in the coating concentrate. In the liquid-vapor region (LV), which exists at low pressures, the carbon dioxide is not fully dissolved in the coating concentrate; the excess forms a vapor or gaseous carbon dioxide-rich phase that is almost entirely carbon dioxide and contains very little solvent vapor. A portion of the bubble point pressure curve separates the liquid and liquid-vapor regions. The bubble point pressure is the pressure at which the first bubble of vapor or gaseous carbon dioxide is formed as the pressure is lowered from high pressure, at a given carbon dioxide level.

At pressures above the bubble point curve, the liquid-liquid region (LL) is entered as the carbon dioxide concentration is increased above the solubility limit, which is about 47 percent. One liquid phase is a polymer-rich phase, which consists of the polymers and solvent saturated with carbon dioxide. The other liquid phase is the carbon dioxide-rich phase, which is primarily carbon dioxide, but it can contain appreciable amounts of solvent extracted from the polymer-rich phase, up to about 30 percent or more. It usually contains relatively little polymer, because carbon dioxide is a non-solvent or very poor solvent for the polymers. The bubble point pressure curve borders the low pressure end of the liquid-liquid region. Below it is the narrow liquid-liquid-vapor (LLV) region. In the LLV region, the excess carbon dioxide not dissolved in the liquid polymer-rich phase forms both a liquid and a gaseous phase. As the pressure is lowered within the LLV region, liquid carbon dioxide is converted to gaseous carbon dioxide.

We have discovered that solid polymer precipitate only forms in the liquid-solid region (LS) at high carbon dioxide concentrations, above about 57 percent and, surprisingly, only at pressures above the bubble point pressure curve. The liquid carbon dioxide-rich phase is primarily carbon dioxide but contains enough solvent extracted from the polymer-rich phase to cause the polymer-rich phase to turn solid. The solid polymer-rich phase generally contains little dissolved carbon dioxide. As the carbon dioxide level increases within the LS region, more solvent is extracted from the solid polymer phase until, in the limit of very high carbon dioxide levels, the liquid phase contains essentially all of the solvent and carbon dioxide, but very little polymer.

As pressure is lowered from within the liquid-solid region, we have discovered that the precipitate is liquefied at the bubble point pressure curve, that is, when gaseous carbon dioxide bubbles are formed. Without wishing to be bound by theory, this is believed to occur because the carbon dioxide gas bubbles contain very little solvent. Therefore, the liquid carbon dioxide-rich phase from which the bubbles form becomes relatively richer in solvent, which in turn enriches the polymer-rich phase with enough solvent to liquefy it. As the pressure is lowered, by expanding the volume slowly to maintain constant temperature, When the bubble pressure is reached, the pressure remains constant for a period as the expansion produces more gas. As more gas forms, more solvent is redissolved into the polymer phase, which becomes more liquid. The pressure then resumes dropping with further expansion. Similarly, we have discovered that the process is reversed as the pressure is increased from the LLV region. The liquid polymer-rich phase becomes solid as the last gas bubbles dissolve into the liquid carbon dioxide-rich phase, which causes solvent to be extracted from the polymer-rich phase.

Because the temperature is below the critical temperature for carbon dioxide, the bubble point pressure curve ends at the vapor pressure of carbon dioxide (point CP) in the limit of 100 percent carbon dioxide.

If the carbon dioxide and nitrocellulose coating concentrate in FIG. 6 are admixed at a pressure P of 1300 psi and feed temperatures $T_1$ and $T_2$ of 27° Celsius, then the carbon dioxide feed corresponds to point A and the coating concentrate feed corresponds to point B. If they are admixed in proportions that give a final concentration of 30 percent carbon dioxide, then the final well mixed admixture corresponds to point C. Therefore, during admixing, the coating concentrate can be considered to follow a constant pressure trajectory that passes through the liquid region (L) from point B to point C. However, we have discovered that the carbon dioxide can be considered to follow the trajectory that passes through the liquid-solid region (LS) and the liquid-liquid region (LL) before entering the liquid region (L). Therefore, during the initial stage of mixing the carbon dioxide into the coating concentrate, solvent extraction from the coating concentrate by the carbon dioxide causes polymer precipitation, so a completely liquid admixture only forms after the precipitate is fully redissolved. However, FIG. 6 is for equilibrium, where mixing time is not a factor. The aforementioned experimental results demonstrate that the dissolved polymer precipitates very rapidly when the pressure is increased across the bubble point pressure from the LLV region to the LS region, but that the solid polymer liquefies much slower when the pressure is lowered again. Therefore, redissolution of precipitated polymer during the admixing process can require much more time than the precipitation step, so precipitate can accumulate in the precipitation zone and form a plug in the flow.

However, FIG. 6 reveals that if the admixing is done at a pressure below the liquid-solid region, then precipitation can be avoided. For example, if the admixing is done at a pressure P of 800 psi, then the carbon dioxide feed corresponds to point D, the coating concentrate feed corresponds to point E, and the well mixed admixture corresponds to point F. Then the carbon dioxide mixing trajectory passes from point D to point F through the liquid-vapor (LV) region to the liquid region (L). There is no driving force for solids formation, even though the mixing is not at equilibrium, because it does not pass through the liquid-solid region. After the admixture is formed at point F, it can then be pressurized to point C for utilization at 1300 psi. Of course, the admixture can also be heated to higher temperature, such as 50° Celsius, for spraying.

Figure 7:
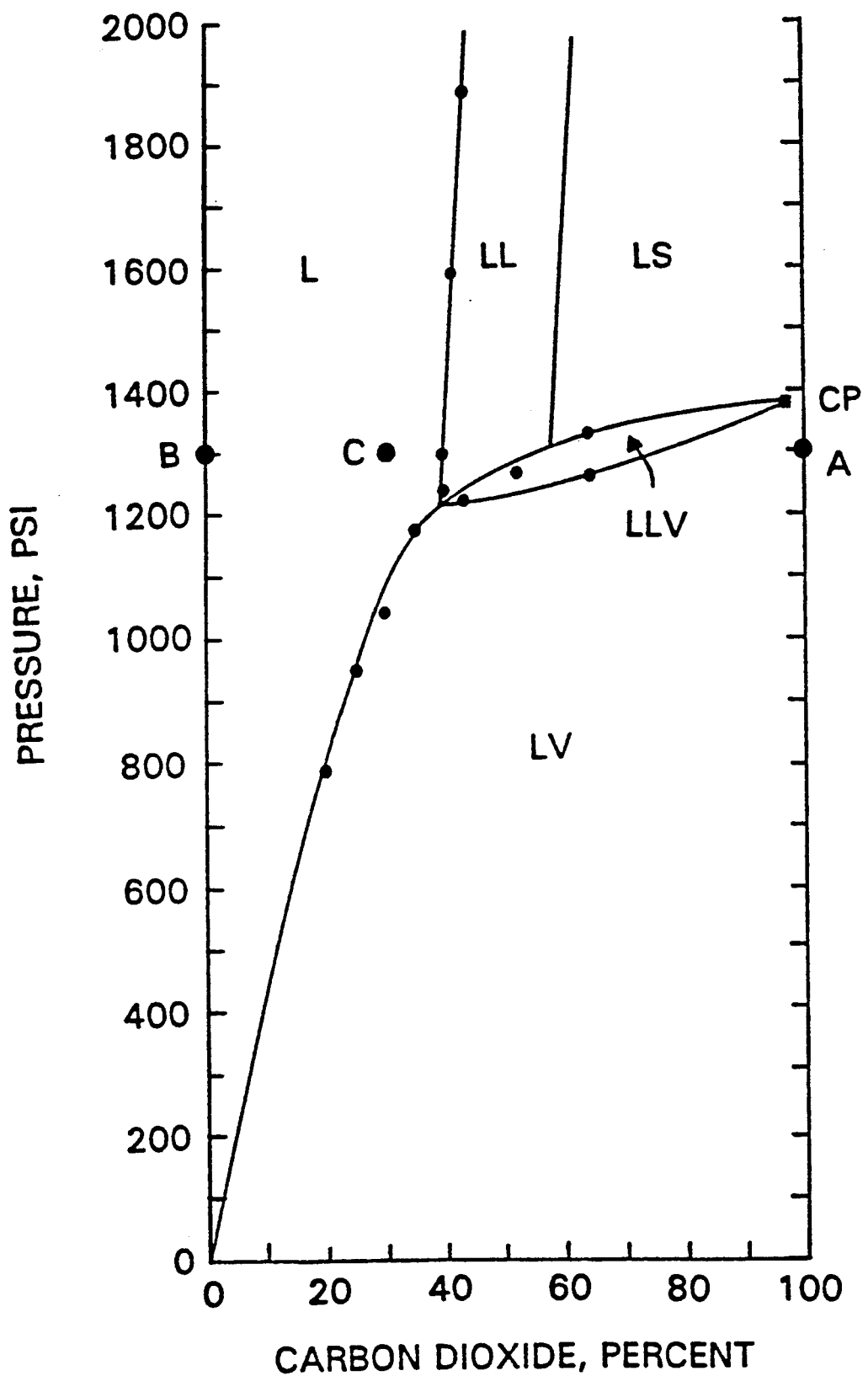
FIG. 7 is a phase diagram that illustrates the number and types of phases formed and the critical bubble pressure for admixtures of a commercial nitrocellulose coating concentrate and compressed carbon dioxide as a function of pressure and carbon dioxide concentration at a temperature of 50° Celsius.

We have furthermore discovered that the solids forming region can be displaced to higher pressure by using a higher admixing temperature. FIG. 7 shows the same system as in FIG. 6, but measured at a temperature of 50° Celsius. The solids forming region (LS) has been displaced about 400 psi higher in pressure. Therefore, the admixing can be done at 1300 psi and the solids forming region can be avoided. The carbon dioxide feed corresponds to point A, the coating concentrate feed corresponds to point B, and the well mixed admixture corresponds to point C in FIG. 7. The carbon dioxide mixing trajectory therefore passes through the liquid-liquid-vapor region (LLV) and the liquid-vapor region (LV) before entering the liquid region (L). The admixture thus formed can then be sprayed at the same temperature and pressure as admixed.

Because the temperature of the phase diagram in FIG. 7 is above the critical temperature of carbon dioxide, the bubble point pressure curve ends at less than 100 percent carbon dioxide at a point CP, which we have discovered corresponds to the critical point of the system consisting of just the solvent blend of the coating concentrate and the compressed fluid, with no polymers. Because the solid polymer phase in the LS region has very little solvent and the liquid carbon dioxide phase has very little dissolved polymer, the polymer has little effect on the bubble pressure in the limit of very high carbon dioxide concentration. The decreasing effect of the polymer on the bubble pressure can be seen by how the bubble point pressure curve levels off and asymptotically approaches the limiting pressure at point CP when the curve borders the LL and LS regions instead of the L. Measurements show that the bubble pressure curve for the system of solvent blend and carbon dioxide with no polymer also asymptotically approaches the bubble pressure curve bordering the liquid-solid region.

As used herein, the phrase "critical bubble pressure" is understood to mean the limiting pressure of the bubble point pressure curve for the admixture in the limit as the compressed fluid concentration approaches close to 100 percent. When the temperature is above the critical temperature of the compressed fluid, the critical bubble pressure generally corresponds to the critical point pressure of the system consisting of the solvent blend of the solvent-borne composition and compressed fluid. This corresponds to the pressure of point CP in FIG. 7. When the temperature equals the critical temperature of the compressed fluid, the critical bubble pressure corresponds to the critical pressure of the compressed fluid.

When the temperature is below the critical temperature of the compressed fluid, the critical bubble pressure corresponds to the vapor pressure of the compressed fluid. This corresponds to the pressure of point CP in FIG. 6. The critical bubble pressure increases with the temperature of the phase diagram system.

The critical bubble pressure can be measured or it can be calculated from the physical properties of the solvent blend and the compressed fluid by correlation methods known to those skilled in the art. For example, see Reid, R. C., Prausnitz, J. M., and Sherwood, T. K., *The Properties of Gases and Liquids*, McGraw-Hill Book Company, 1977, pages 145-148, for thermodynamic methods of calculating the critical pressure of mixtures from the components. The critical temperature is the same as the temperature chosen for the phase diagram. The calculation method chosen should be verified as being accurate for the solvents used.

Figure 8:
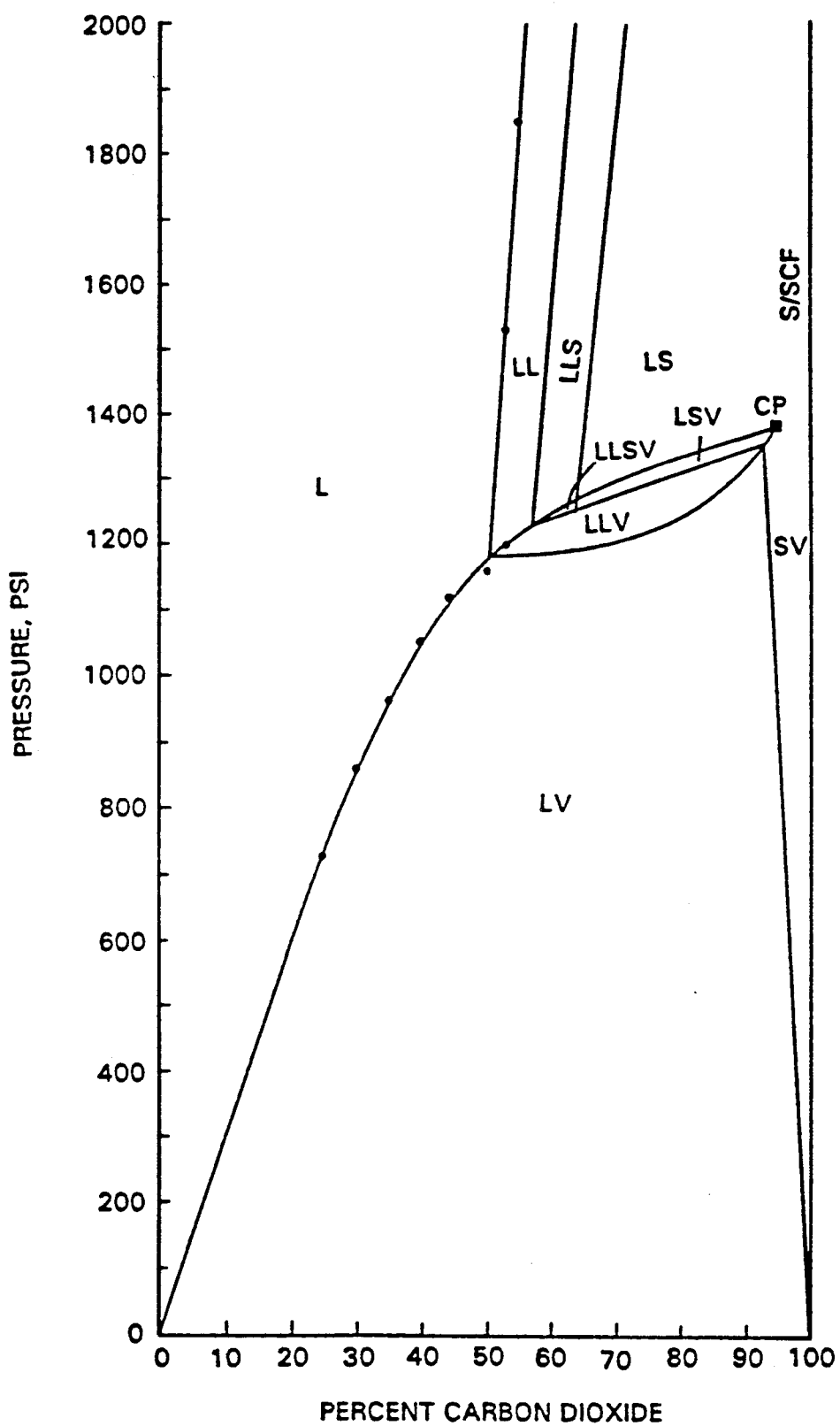
FIG. 8 is a phase diagram that illustrates the number and types of phases formed and the critical bubble pressure for admixtures of compressed carbon dioxide and a solvent-borne composition comprising 30 percent cellulose acetate butyrate in methyl amyl ketone solvent as a function of pressure and carbon dioxide concentration at a temperature of 50° Celsius.

The measured phase diagram for another cellulosic polymer, cellulose acetate butyrate, at a solid polymer level of 30 percent by weight dissolved in methyl amyl ketone solvent, is shown in FIG. 8 with carbon dioxide as the compressed fluid at a temperature of 50° Celsius. The phase diagram was measured in better detail for this single polymer and single solvent system. In addition to the regions aforementioned in FIGS. 6 and 7, three transition regions are apparent: 1) a liquid-liquid-solid region (LLS) between the LL and LS regions; 2) a narrow liquid-liquid-solid-vapor region (LLSV) between the LLS and LLV regions; and 3) a narrow liquid-solid-vapor region (LSV) between the LS and LLV regions. The solids formed in the LLSV and LSV transition regions were found to be a clear gel-like precipitate that was considerably softer than the white firm precipitate formed in the LS region. A narrow solid-vapor region (SV) is also shown at very high carbon dioxide concentrations, wherein the admixture contains just a few weight percent of concentrate. Because of the abundance of carbon dioxide gas, solvent evaporates from the concentrate, which causes the polymer to solidify. At this limit of very high carbon dioxide concentration above the critical bubble point concentration (point CP), as the pressure is increased above the critical bubble pressure, no phase transition boundary is seen as the carbon dioxide-solvent vapor becomes a supercritical fluid mixture (S/SCF).

A phase diagram similar to that in FIG. 8 has also been measured for the same system but with a lower solid polymer level of 20 percent by weight in the solvent-borne composition.

Figure 9:
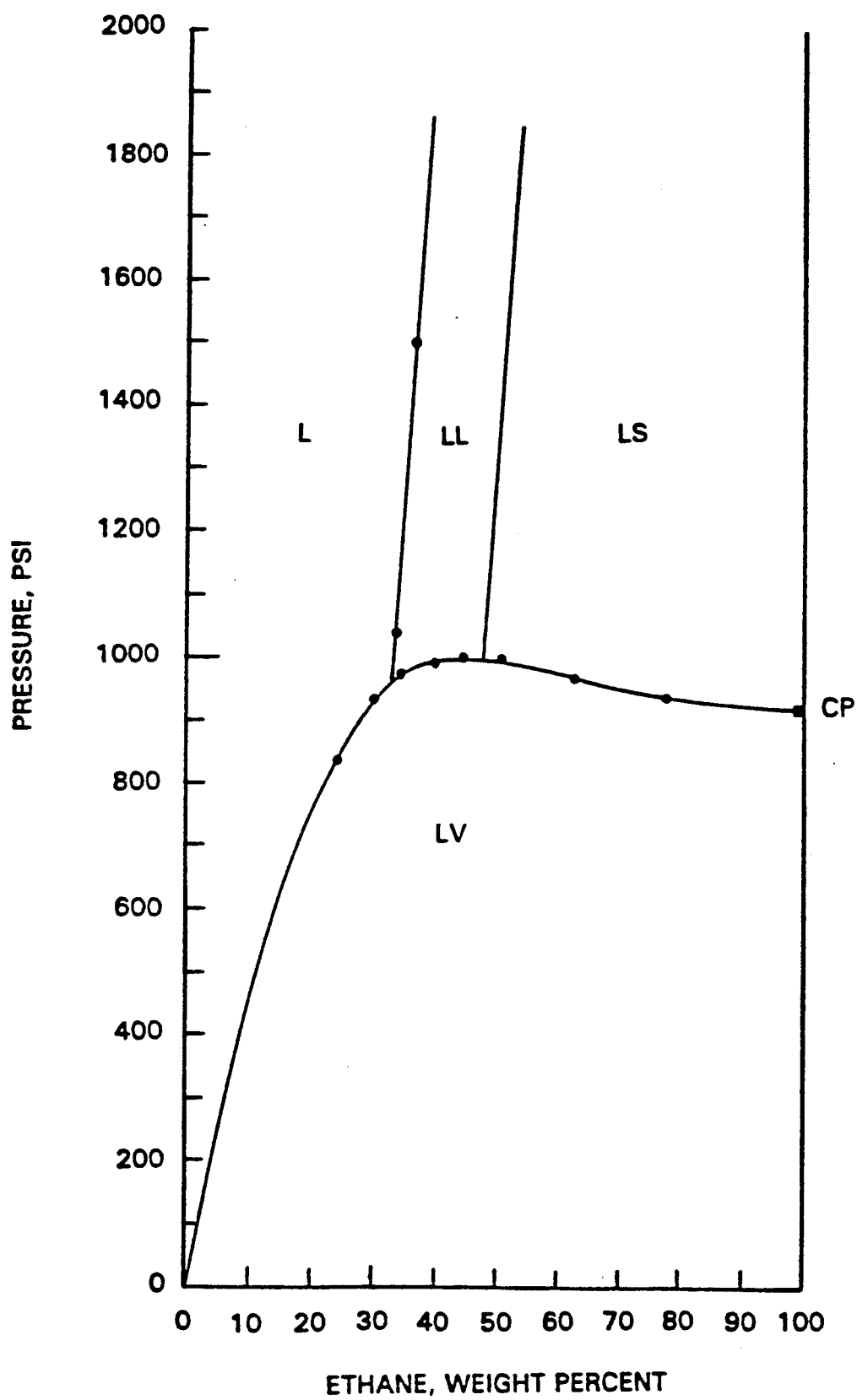
FIG. 9 is a phase diagram that illustrates the number and types of phases formed and the critical bubble pressure for admixtures of compressed ethane and a solvent-borne composition comprising 30 percent cellulose acetate butyrate in methyl amyl ketone solvent as a function of pressure and ethane concentration at a temperature of 50° Celsius.

A phase diagram for the same cellulose acetate butyrate solvent-borne composition of FIG. 8 is shown with ethane being the compressed fluid in FIG. 9 at a temperature of 50° Celsius. The boundary of the narrow LLV region below the bubble point pressure curve was not measured and therefore this region is not shown. The bubble point pressure curve approaches the critical bubble pressure (point CP) as the ethane concentration is increased to a high level. However, the critical bubble pressure is significantly lower than that obtained in FIG. 8 with carbon dioxide, because ethane has a much lower critical pressure.

Phase diagrams with a liquid-solid region above the bubble point pressure curve at high carbon dioxide concentrations have similarly been measured for a high molecular weight thermoplastic solid acrylic polymer dissolved in methyl amyl ketone solvent at a solids level of 38 weight percent.

The critical bubble pressure has been found to be a good approximation for the lowest pressure at which solids form on the phase diagram. Generally, if the mixing trajectory of the compressed fluid is just below the critical bubble pressure, the trajectory passes through only a portion of the liquid-solid region. If the mixing pressure is at somewhat lower pressure, then the liquid-solid region can be missed entirely. Furthermore, the critical bubble pressure can generally be reliably calculated from the physical properties of the solvents and compressed fluid, by calculating the critical pressure of the mixture at the desired temperature without the polymers and other nonextracted components included. Therefore, it is generally not necessary to measure the bubble point pressure curve at high compressed fluid concentrations.

Therefore, in order for the mixing trajectory of the compressed fluid to avoid passing through the liquid-solid region on the phase diagram, preferably the pressure P at which the compressed fluid and solvent-borne composition are admixed is below the critical bubble pressure for the admixture at the feed temperature $T^1$ of the compressed fluid and the pressure P is also below the critical bubble pressure for the admixture at the feed temperature $T_2$ of the solvent-borne composition. More preferably, the pressure P at which the compressed fluid and solvent-borne composition are admixed is below the minimum pressures at which the admixture at a high proportion of compressed fluid forms a mixture comprising a liquid phase and a solid phase when at the temperatures $T_1$ and $T_2$, which can be determined from the corresponding phase diagrams for the system.

While preferred forms of the present invention have been described, it should be apparent to those skilled in the art that methods and apparatus may be employed that are different from those shown without departing from the spirit and scope thereof.

EXAMPLE 1

A solvent-borne composition that is a commercial nitrocellulose coating concentrate and compressed carbon dioxide were indirectly admixed using the modified Nordson UNICARB ® System Supply Unit illustrated in FIG. 5. The coating concentrate contained about 38 weight percent nitrocellulose and alkyd solid polymers dissolved in a solvent blend. The mixing manifold 100 was built into a high pressure sight glass in order to observe the level at which precipitate was formed during the admixing. The admixing pressures P, the feed temperatures $T_1$ of the carbon dioxide and $T_2$ of the precursor admixture containing the coating concentrate, the corresponding solubility parameters of the carbon dioxide and critical bubble pressures at those feed conditions, and the level of precipitate observed are given in the tables below for eight sets of experimental admixing conditions. The feed temperature of the carbon dioxide is the temperature taking into account expansion cooling across control valve 225.

|    | Admixing Pressure P | Feed Temperature Celsius | | Solubility Parameter $(cal/cc)^{\frac{1}{2}}$ | |
|----|---------------------|------|------|-------|-------|
|    |                     | $T_1$ | $T_2$ | $T_1$ | $T_2$ |
| #1 | 930 psi  | 27° | 52° | 2.0 | 1.3 |
| #2 | 1250 psi | 45° | 51° | 2.5 | 2.1 |
| #3 | 1320 psi | 41° | 50° | 3.9 | 2.5 |
| #4 | 1510 psi | 49° | 51° | 3.7 | 3.4 |
| #5 | 910 psi  | 18° | 50° | 6.5 | 1.2 |
| #6 | 1190 psi | 20° | 50° | 6.7 | 2.0 |

-continued

| | | | | | |
|---|---|---|---|---|---|
| #7 | 1650 psi | 45° | 51° | 4.8 | 4.1 |
| #8 | 1650 psi | 21° | 50° | 6.9 | 4.2 |

| | Admixing Pressure P | Critical Bubble Pressure | | Precipitate Level |
|---|---|---|---|---|
| | | $T_1$ | $T_2$ | |
| #1 | 930 psi | 975 psi | 1420 psi | None |
| #2 | 1250 psi | 1305 psi | 1400 psi | None |
| #3 | 1320 psi | 1240 psi | 1385 psi | Light |
| #4 | 1510 psi | 1370 psi | 1400 psi | Light |
| #5 | 910 psi | 790 psi | 1385 psi | Heavy |
| #6 | 1190 psi | 830 psi | 1385 psi | Heavy |
| #7 | 1650 psi | 1305 psi | 1400 psi | Severe |
| #8 | 1650 psi | 845 psi | 1385 psi | Severe |

At admixing conditions #1 and #2, the carbon dioxide was a gas or supercritical fluid, the solubility parameters of the carbon dioxide at temperatures $T_1$ and $T_2$ both had low values below 3.0 and above 1.0 $(cal/cc)^{\frac{1}{2}}$, and the admixing pressure P was below both of the critical bubble pressures at temperatures $T_1$ and $T_2$. At these most preferred conditions no precipitate was formed.

At admixing conditions #13 and #4, the carbon dioxide was a supercritical fluid, the solubility parameters of the carbon dioxide at temperatures $T_1$ and $T_2$ both had values below about 4.0 and above about 2.5 $(cal/cc)^{\frac{1}{2}}$. At conditions #3, the admixing pressure P was below the critical bubble pressure at temperature $T_2$ but above the critical bubble pressure at temperature $T_1$. At conditions #4, the admixing pressure P was above both of the critical bubble pressures at $T_1$ and $T_2$. At these conditions, precipitate was formed at a light level that was much too low to eventually plug the apparatus.

In contrast, at admixing conditions #5 and #6, which are not in accordance with the present invention, at feed temperatures $T_1$ the carbon dioxide was a liquid, the solubility parameters were well above 4.0 $(cal/cc)^{\frac{1}{2}}$, and the admixing pressures P were above the critical bubble pressures. At feed temperatures $T_2$, the solubility parameters had low values and the admixing pressures P were below the critical bubble pressures. At these conditions, precipitate was formed at a heavy level that filled the sight glass and would eventually plug the apparatus.

At admixing conditions #7 and #8, which are not in accordance with the present invention, at feed temperatures $T_1$ the carbon dioxide was a liquid and at feed temperatures $T_2$ it was a dense supercritical fluid. At both feed temperatures $T_1$ and $T_2$, the solubility parameters were above 4.0 $(cal/cc)^{\frac{1}{2}}$ and the admixing pressure P was significantly above the critical bubble pressures. At these conditions, precipitate was formed at a severe level that rapidly plugged the apparatus.

EXAMPLE 2

The apparatus illustrated in FIG. 5 was used to directly admix the nitrocellulose coating concentrate used in Example 1 with compressed carbon dioxide. The admixture 120 flowed into a circulation loop consisting of a circulation pump, a heater, a flow-through piston-type accumulator, and a high pressure sight glass. A large amount of admixture having a high carbon dioxide concentration of 64 weight percent was purged through the circulation loop with constant circulation. The admixing and loop pressure was maintained just below the bubble point pressure, so that the admixture was in the liquid-liquid-vapor region of the phase diagram at a temperature of about 60° Celsius. This showed that the admixture remained very fluid and well dispersed with no precipitate forming, despite maintaining the entire loop apparatus at this high carbon dioxide level, not just the admixing zone. The admixture feed was then shut off and the loop pressure was slowly increased by applying compressed nitrogen to the accumulator. When the pressure reached the bubble point pressure, all of the polymer rapidly precipitated, dropping out of solution and adhering to the apparatus.

EXAMPLE 3

A solvent-borne composition that is a commercial nitrocellulose coating concentrate and compressed carbon dioxide were indirectly admixed using the modified Nordson UNICARB® System Supply Unit in a commercial production spray operation. The admixing pressure P was 1300 psi. The feed temperature $T_1$ of the carbon dioxide was 65° Celsius and the feed temperature of the precursor admixture containing the coating concentrate and recycled admixture was 59° Celsius. The carbon dioxide was a supercritical fluid at both temperatures. The carbon dioxide had solubility parameter values of 1.8 $(cal/cc)^{\frac{1}{2}}$ at pressure P and temperature $T_1$ and 2.0 $(cal/cc)^{\frac{1}{2}}$ at pressure P and temperature. The admixing pressure P was below the critical bubble pressure of 1640 psi at temperature $T_1$ and below the critical bubble pressure of 1540 psi at temperature $T_2$. These most preferred admixing conditions produced long term, sustained, plug-free operation of the spray unit in commercial production. Before the present invention was utilized, precipitation and plugging of the spray unit was a persistent problem that would frequently shut down operation of the spray unit and halt production.

What is claimed is:

1. In a method for pressurizing, proportioning, admixing, and forming an admixture of (i) a solvent-borne composition containing a high concentration of at least one solid polymer capable of being sprayed as a liquid solution and (ii) at least one compressed fluid as a viscosity reducing diluent, in at least an amount which when added to (i) is sufficient to render the viscosity of said admixture to a point suitable for being transportable, said compressed fluid being a gas at standard conditions of 0° Celsius temperature and one atmosphere pressure (STP), the improvement which comprises:

admixing the solvent-borne composition and the at least one compressed fluid together at pressure P, with the at least one compressed fluid having feed temperature $T_1$, such that the at least one compressed fluid, at pressure P and temperature $T_1$, is substantially a gas or a supercritical fluid and has a solubility parameter of about 0.5 to about 4 $(cal/cc)^{\frac{1}{2}}$, thereby substantially avoiding undesirable precipitation of said solid polymer and consequential plugging of the apparatus.

2. The method of claim 1, wherein the solvent-borne composition has feed temperature $T_2$ and the at least one compressed fluid, at pressure P and temperature $T_2$, is substantially a gas or a supercritical fluid and has a solubility parameter of about 0.5 to about 4 $(cal/cc)^{\frac{1}{2}}$.

3. The method of claim 1, wherein the compressed fluid has a solubility parameter of about 1.0 to about 3.0 $(cal/cc)^{\frac{1}{2}}$.

4. The method of claim 2, wherein the pressure P is below the critical bubble pressures of the admixture at temperatures $T_1$ and $T_2$.

5. The method of claim 2, wherein the pressure P is below the minimum pressures at which an admixture of the solvent-borne composition and a high proportion of the at least one compressed fluid at equilibrium forms a mixture comprising a liquid phase and a solid phase when at temperatures $T_1$ and $T_2$.

6. The method of claim 2, wherein the feed temperature $T_1$ of the compressed fluid and the feed temperature $T_2$ of the solvent-borne composition are above the critical temperature of the compressed fluid and below about 100° Celsius.

7. The method of claim 1, wherein the compressed fluid is carbon dioxide, nitrous oxide, ethane, ethylene, propane, or a combination thereof.

8. The method of claim 1, wherein the solvent-borne composition comprises a solvent-borne coating composition.

9. The method of claim 1, wherein the solid polymer has a solubility parameter greater than about 10 $(cal/cc)^{\frac{1}{2}}$.

10. The method of claim 1, wherein the solid polymer is a cellulosic polymer.

11. The method of claim 10, wherein the cellulosic polymer is a nitrocellulose polymer.

12. The method of claim 1, further comprising spraying the admixture by passing the admixture under pressure through an orifice to form a spray.

13. In a method for pressurizing, proportioning, admixing, and forming an admixture of (i) a solvent-borne composition containing a high concentration of at least one solid polymer capable of being sprayed as a liquid solution and (ii) at least one compressed fluid as a viscosity reducing diluent, in at least an amount which when added to (i) is sufficient to render the viscosity of said admixture to a point suitable for being transportable, said compressed fluid being a gas at standard conditions of 0° Celsius temperature and one atmosphere pressure (STP), the improvement which comprises:

(1) forming a precursor admixture by admixing the solvent-borne composition with a recycled admixture of solvent-borne composition and at least one compressed fluid; and (2) admixing the precursor admixture and the at least one compressed fluid together at pressure P, with the at least one compressed fluid having feed temperature $T_1$, such that the at least one compressed fluid, at pressure P and temperature $T_1$, is substantially a gas or a supercritical fluid and has a solubility parameter of about 0.5 to about 4 $(cal/cc)^{\frac{1}{2}}$, thereby substantially avoiding undesirable precipitation of said solid polymer and consequential plugging of the apparatus.

14. The method of claim 13, wherein the precursor admixture has feed temperature $T_2$ and the at least one compressed fluid, at pressure P and temperature $T_2$, is substantially a gas or a supercritical fluid and has a solubility parameter of about 0.5 to about 4 $(cal/cc)^{\frac{1}{2}}$.

15. The method of claim 13, wherein the compressed fluid has a solubility parameter of about 1.0 to about 3.0 $(cal/cc)^{\frac{1}{2}}$.

16. The method of claim 14, wherein the pressure P is below the critical bubble pressures of the admixture at temperatures $T_1$ and $T_2$.

17. The method of claim 14, wherein the pressure P is below the minimum pressures at which an admixture of the solvent-borne composition and a high proportion of the at least one compressed fluid at equilibrium forms a mixture comprising a liquid phase and a solid phase when at temperatures $T_1$ and $T_2$.

18. The method of claim 14, wherein the feed temperature $T_1$ of the compressed fluid and the feed temperature $T_2$ of the precursor admixture are above the critical temperature of the compressed fluid and below about 100° Celsius.

19. The method of claim 13, wherein the compressed fluid is carbon dioxide, nitrous oxide, ethane, ethylene, propane, or a combination thereof.

20. The method of claim 13, wherein the solvent-borne composition comprises a solvent-borne coating composition.

21. The method of claim 13, wherein the solid polymer has a solubility parameter greater than about 10 $(cal/cc)^{\frac{1}{2}}$.

22. The method of claim 13, wherein the solid polymer is a cellulosic polymer.

23. The method of claim 22, wherein the cellulosic polymer is a nitrocellulose polymer.

24. The method of claim 13, further comprising spraying the admixture by passing the admixture under pressure through an orifice to form a spray.

* * * * *